United States Patent
Child et al.

(10) Patent No.: US 10,796,160 B2
(45) Date of Patent: Oct. 6, 2020

(54) INPUT AT INDOOR CAMERA TO DETERMINE PRIVACY

(71) Applicant: Vivint, Inc., Provo, UT (US)

(72) Inventors: Michael D. Child, Lehi, UT (US); Michelle Zundel, Draper, UT (US)

(73) Assignee: Vivint, Inc., Provo, UT (US)

( * ) Notice: Subject to any disclaimer, the term of this patent is extended or adjusted under 35 U.S.C. 154(b) by 284 days.

(21) Appl. No.: 15/002,538

(22) Filed: Jan. 21, 2016

(65) Prior Publication Data

US 2017/0213088 A1 Jul. 27, 2017

(51) Int. Cl.
| | |
|---|---|
| H04N 7/18 | (2006.01) |
| G06K 9/46 | (2006.01) |
| G06T 7/20 | (2017.01) |
| G08B 13/196 | (2006.01) |
| G07C 9/00 | (2020.01) |
| G06F 21/62 | (2013.01) |
| G06K 9/00 | (2006.01) |

(52) U.S. Cl.
CPC ..... *G06K 9/00771* (2013.01); *G06K 9/00362* (2013.01); *G08B 13/19686* (2013.01); *H04N 7/181* (2013.01); *G06K 2009/4666* (2013.01); *G08B 13/19656* (2013.01)

(58) Field of Classification Search
CPC .. G06K 9/00771; G06K 9/00362; G06K 9/46; G06K 2009/4666; G06T 7/20; G06T 2207/30196; H04N 7/181
USPC .................................................. 348/153, 53
See application file for complete search history.

(56) References Cited

U.S. PATENT DOCUMENTS

| | | | |
|---|---|---|---|
| 7,504,942 B2 | 3/2009 | Marman | |
| 7,856,558 B2 | 12/2010 | Martin et al. | |
| 8,253,770 B2 * | 8/2012 | Kurtz | H04N 7/142 348/14.01 |
| 8,730,029 B2 | 5/2014 | Petricoin, Jr. | |
| 9,179,105 B1 * | 11/2015 | Zeira | H04N 5/2254 |
| 9,582,709 B2 * | 2/2017 | Wang | G06K 9/00288 |
| 9,728,077 B1 * | 8/2017 | Fu | G08B 29/185 |
| 2010/0033302 A1 * | 2/2010 | Yamamoto | G06K 9/00771 340/5.82 |
| 2012/0019643 A1 * | 1/2012 | Gideon | H04N 21/25883 348/77 |
| 2014/0267716 A1 * | 9/2014 | Child | H04N 7/186 348/143 |
| 2015/0104103 A1 | 4/2015 | Candelore | |
| 2015/0248798 A1 | 9/2015 | Howe et al. | |
| 2016/0260135 A1 * | 9/2016 | Zomet | H04L 12/2812 |

\* cited by examiner

*Primary Examiner* — Susan E. Hodges
(74) *Attorney, Agent, or Firm* — Holland & Hart, LLP

(57) ABSTRACT

Methods, systems, and devices related to memory, including read or write performance of a phase change memory, are described. A plurality of memory cells of a memory array may be read. A total number of read errors resulting from the read operation of the plurality of memory cells may be determined, and reference read currents may be adjusted if the total number of read errors exceeds an error threshold. In some examples, adjusting reference read currents includes reading a reference memory cell, determining a current shift for the reference memory cell, and adjusting read currents for other memory cells of the memory array by a current delta based at least in part on the current shift.

18 Claims, 7 Drawing Sheets

INPUT AT INDOOR CAMERA TO DETERMINE PRIVACY

BACKGROUND

The present disclosure, for example, relates to home security and/or automation systems, and more particularly to providing systems and methods for adaptive privacy for indoor security and monitoring cameras.

Home automation systems are widely deployed to provide various types of communication and functional features such as monitoring, communication, notification, and/or others. These systems may be capable of supporting communication with an occupant through a communication connection or a system management action.

Existing security cameras may be set to record continuously, to record on a predetermined schedule, or in some cases, to begin recording upon detecting movement or other occupancy data. Such general recording parameters, however, may not allow for desired occupant privacy. While homeowners may wish to record possible intruders, or even welcome guests, homeowners may be less comfortable being monitored by their security systems in their own homes. Accordingly, it may be desirable to provide a method for automatically deactivating components of a home security system in order to afford privacy to permitted home occupants.

SUMMARY

While homeowners may be interested in recording audio and/or video activity in their homes when they are away, for example to detect intruders or to monitor a nanny, many homeowners may be uncomfortable with the prospect of being monitored themselves, in their own homes. Existing home monitoring systems may be manually operated, or may be operated on predetermined schedules or based upon detection of an intruder. These systems may not allow for automatic deactivation of a monitoring system based on particular circumstances. For example, a homeowner may wish to disable video monitors within his home upon his arrival home each day, without the need to manually turn off the system. Accordingly, the present disclosure provides a method for security and/or automation systems, which may include operating a plurality of video monitoring components of the security and/or automation system, and detecting a first occupant in a location associated with the security and/or automation system. The method may further include identifying the detected first occupant, and disabling at least one of the plurality of video monitoring components based at least in part on an inputted privacy preference associated with the first occupant.

In some examples, an occupant may wish to disable any video and audio recording of himself when he is in his home, in the particular room which he is currently occupying, while maintaining monitoring of other rooms, regardless of their occupancy status. Thus, the occupant may input a privacy preference at his home automation or security system, indicating that, upon detecting that he is present in the home, the home automation system should automatically disable any video and/or audio monitors positioned in the same part of the home which he is currently occupying. The home automation system may identify the occupant using known facial recognition techniques, and may compare the identified occupant with the previously inputted privacy preferences. As the occupant moves through the home, the home automation system may detect his presence in various rooms, and may activate and disable various monitoring systems accordingly. In this way, the occupant may have a "privacy cloak" as he moves through his home, while still maintaining active monitoring of other parts of the house.

In other examples, an occupant may wish to disable all monitoring systems in his home when he is home, such that other family members in the home are also not monitored. Such privacy preferences may similarly be inputted at the home automation system. In various embodiments, each individual in a home may input individual privacy preferences, such that appropriate privacy preferences may be adhered to, based upon identified individuals in the home. In some cases, a privacy priority preference may be inputted, such that the home automation system may know to follow the father's privacy preferences over privacy preferences inputted by a child in the home. Thus, where a child has inputted a preference to disable only monitoring systems located in rooms which she is not currently occupying, while the father has inputted a preference to disable all monitoring systems when his is in the home, the home automation system may implement the privacy preferences inputted by the father upon detecting that the father is home, even if the child is also detected.

In some examples, disabling the at least one of the plurality of video monitoring components may include detecting a location of the identified first occupant, and disabling at least one of the plurality of video monitoring components based at least in part on the detected location of the identified first occupant. In some examples, the disabled at least one of the plurality of video monitoring components may be positioned proximate to the detected location of the identified first occupant.

In some examples, the method may further include detecting an updated location of the identified first occupant, and updating an operation status of at least one of the plurality of video monitoring components based at least in part on the detected updated location of the first occupant.

In some examples, the method may include detecting that the identified first occupant has left the location, and operating at least one of the plurality of video monitoring components based at least in part on the detecting.

In some examples, the method may include detecting a second occupant in the location, and identifying the second occupant. The method may further include comparing an inputted privacy preference associated with the second occupant with an inputted privacy priority preference, and updating an operation status of at least one of the plurality of video monitoring components based at least in part on the comparing.

In some examples, the method may further include updating the operation status of at least one of the plurality of video monitoring components based at least in part on an inputted command, and deriving a privacy priority preference based at least in part on the inputted command.

In some examples, each of the plurality of video monitoring components of the security and/or automation system associated with the location may include any of a video monitoring component, or an audio monitoring component, or a combination thereof. In some examples, disabling at least one of the plurality of video monitoring components may include disabling the video monitoring components, or disabling the audio monitoring components, or disabling a combination thereof.

In some examples, identifying the detected first occupant may include identifying facial data associated with the first occupant, or physiological data associated with the first occupant, or audio data associated with the first occupant, or an inputted code associated with the first occupant, or a wireless signal transmitted by a device associated with the first occupant, or a combination thereof.

The present disclosure also relates to an apparatus for security and/or automation systems. In some examples, the apparatus may include a processor, memory in electronic communication with the processor, and instructions stored in the memory. In some embodiments, the instructions may be executable by the processor to operate a plurality of video monitoring components of the security and/or automation system, and to detect a first occupant in a location associated with the security and/or automation system. In some examples, the instructions may be further executable by the processor to identify the detected first occupant, and disable at least one of the plurality of video monitoring components based at least in part on an inputted privacy preference associated with the first occupant.

The present disclosure also relates to a non-transitory computer-readable medium storing computer-executable code, the code executable by a processor to operate a plurality of video monitoring components of the security and/or automation system. In some examples, the code may be further executable by the processor to detect a first occupant in a location associated with the security and/or automation system, and identify the detected first occupant. In some examples, the code may be further executable by the processor to disable at least one of the plurality of video monitoring components based at least in part on an inputted privacy preference associated with the first occupant.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

A system providing adaptive privacy for home automation and/or security systems is described below. While existing systems may allow for manual deactivation of monitoring components of a home security system when a particular homeowner returns home, there is lacking a method by which the system may identify an authorized homeowner in the home and automatically disable one or more monitoring components of the security system based at least in part on this identification. This automatic deactivation may allow for homeowner privacy in his home, without the need to manually disable video and/or audio monitoring components.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
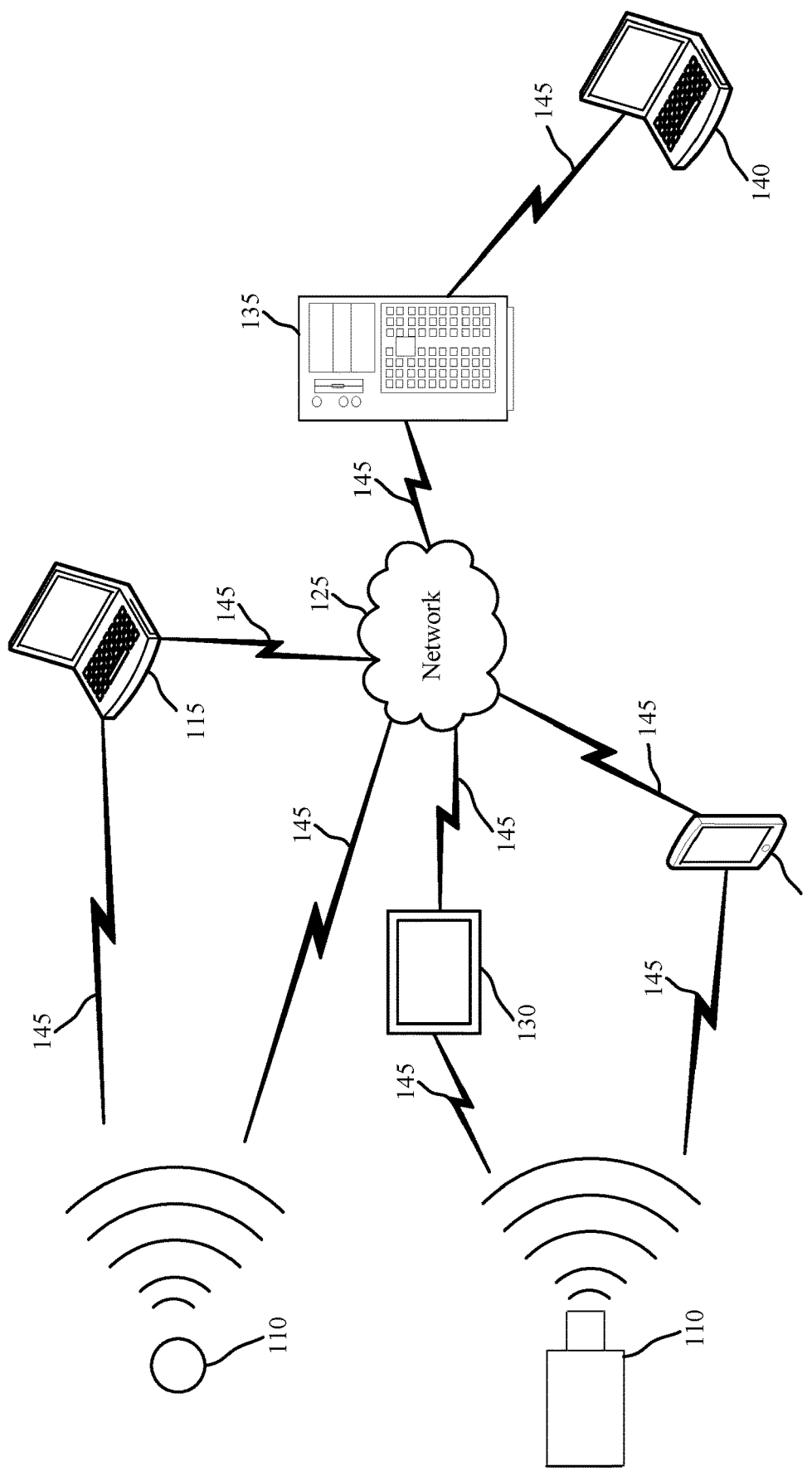
FIG. 1 shows a block diagram relating to an example of a home security and/or automation system, in accordance with various aspects of this disclosure.

FIG. 1 is an example of a security and/or automation system 100 in accordance with various aspects of this disclosure. In some embodiments, the security and/or automation system 100 may include one or more sensor units 110, local computing device 115, 120, network 125, server 135, control panel 130, and remote computing device 140. One or more sensor units 110 may communicate via wired or wireless communication links 145 with one or more of the local computing device 115, 120 or network 125. The network 125 may communicate via wired or wireless communication links 145 with the control panel 130 and the remote computing device 140 via server 135. In alternate embodiments, the network 125 may be integrated with any one of the local computing device 115, 120, server 135, or remote computing device 140, such that separate components are not required.

Local computing device 115, 120 and remote computing device 140 may be custom computing entities configured to interact with one or more sensor units 110 via network 125, and in some embodiments, via server 135. In other embodiments, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smartphone, a mobile phone, a personal digital assistant (PDA) a smartwatch, a wearable electronic device, and/or any other suitable device operable to send and receive signals, store and retrieve data, and/or execute modules.

Control panel 130 may be a smart home system panel, for example, an interactive panel mounted on a wall in an occupant's home. Control panel 130 may be in direct communication via wired or wireless communication links 145 with the one or more sensor units 110, or may receive sensor data from the one or more sensor units 110 via local computing devices 115, 120 and network 125, or may receive data via remote computing device 140, server 135, and network 125.

The local computing devices 115, 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from one or more sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smartphone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote occupant to monitor the output of the sensor units 110. The remote computing device 140 may be functionally and/or structurally similar to the local computing devices 115, 120 and may be operable to receive data streams from and/or send signals to at least one of the one or more sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and server 135.

In some embodiments, the one or more sensor units 110 may be sensors configured to conduct periodic or ongoing automatic functions (e.g., identifications, determinations, measurements, etc.) associated with a monitored home occupant. In some examples, at least one of the one or more sensor units 110 may be a freestanding video monitoring device, or may be a video monitoring component of the home automation and/or security system. Each sensor unit 110 may be capable of sensing one or more physiological, audio, video, environmental, wireless signal, and/or motion parameters (among other things) associated with the monitored home occupant, or alternatively, separate sensor units 110 may monitor separate parameters associated with the home occupant. For example, one sensor unit 110 may measure audio, for example by detecting the sound of the monitored home occupant opening a door or otherwise entering the home, and/or the like, while another sensor unit 110 (or, in some embodiments, a different element of the same sensor unit 110) may be a video monitor configured to record entrance or movement of home occupants or visitors in the home. In some embodiments, one or more sensor units 110 may additionally monitor alternative parameters associated with the monitored home occupant, such as motion, vibration, audio, wireless signals emitted by devices associated with the home occupant, and the like. In still other embodiments, sensor units 110 may be configured to detect facial data associated with the monitored home occupant in order to identify the occupant.

Data gathered by the one or more sensor units 110 may be communicated to local computing device 115, 120, which may be, in some embodiments, a thermostat or other wall-mounted input/output smart home display. In other embodiments, local computing device 115, 120 may be a personal computer or a smartphone, among other things. The local computing device 115, 120 may process the data received from the one or more sensor units 110 to determine whether to disable at least one of a plurality of video monitoring components of the home automation and/or security system. In some embodiments, remote computing device 140 may process the data received from the one or more sensor units 110, via network 125 and server 135, to determine whether the plurality of video monitoring components should be disabled. Data transmission may occur via, for example, frequencies appropriate for a personal area network (such as BLUETOOTH® or IR communications) or local or wide area network frequencies such as radio frequencies specified by the IEEE 802.15.4 standard, among others.

In some embodiments, local computing device 115, 120 may communicate with remote computing device 140 or control panel 130 via network 125 and server 135. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, an occupant may access the functions of local computing device 115, 120 from remote computing device 140. For example, in some embodiments, remote computing device 140 may include a mobile application that interfaces with one or more functions of local computing device 115, 120.

The server 135 may be configured to communicate with the one or more sensor units 110, the local computing devices 115, 120, the remote computing device 140, and control panel 130. The server 135 may perform additional processing on signals received from the one or more sensor units 110 or local computing devices 115, 120, or may simply forward the received information to the remote computing device 140 and control panel 130.

Server 135 may be a computing device operable to receive data streams (e.g., from one or more sensor units 110 and/or local computing device 115, 120 or remote computing device 140), store and/or process data, and/or transmit data and/or data summaries (e.g., to remote computing device 140). For example, server 135 may receive a stream of video data (among other data types) from a sensor unit 110, a stream of occupancy data from the same or a different sensor unit 110, and a stream of facial data (among other data types) from either the same or yet another sensor unit 110. In some embodiments, server 135 may "pull" the data streams, e.g., by querying the sensor units 110, the local computing devices 115, 120, and/or the control panel 130. In some embodiments, the data streams may be "pushed" from the sensor units 110 and/or the local computing devices 115, 120 to the server 135. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 135 may include a database (e.g., in memory) containing audio, video, physiological, occupancy, profile, medical, past monitoring action(s), and/or other data received from the sensor units 110 and/or the local computing devices 115, 120, among other components. Additionally, as described in further detail herein, software (e.g., stored in memory) may be executed on a processor of the server 135. Such software (executed on the processor) may be operable to cause the server 135 to monitor, process, summarize, present, and/or send a signal associated with the monitored occupant data.

Figure 2:
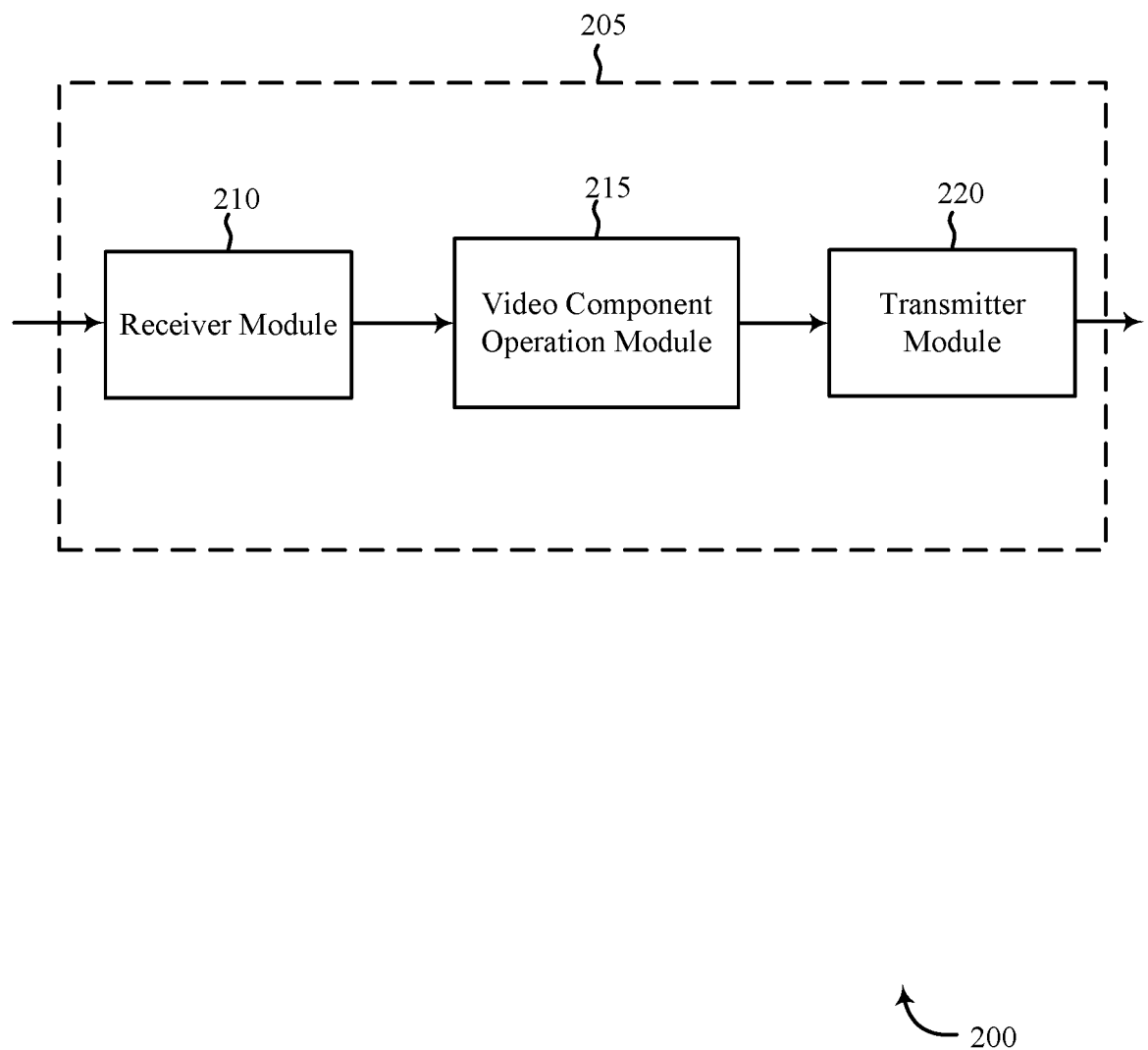
FIG. 2 shows a block diagram of a device relating to a home security and/or automation system, in accordance with various aspects of this disclosure.

FIG. 2 shows a block diagram 200 of an apparatus 205 for use in security and/or automation systems, in accordance with various aspects of this disclosure. The apparatus 205 may be an example of one or more aspects of any of a control panel 130, one or more sensor units 110, local computing device 115, 120, and/or remote computing device 140 described with reference to FIG. 1, among others. The apparatus 205 may include a receiver module 210, a video component operation module 215, and/or a transmitter module 220. The apparatus 205 may also be or include a processor. Each of these modules may be in communication with each other, directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, occupant data, and/or control information associated with various information channels (e.g., control channels, data channels, etc.). In some embodiments, where the receiver module 210 is an example of one or more aspects of the one or more sensor units 110 of FIG. 1, the receiver module 210 may be configured to detect any of audio, video, light, physiological (including heart rate, respiration rate, posture, sleep status, identity, etc.), and/or movement (including occupancy and location) data (among other things) associated with the monitored occupant(s). In other embodiments, where the receiver module 210 is an example of one or more aspects of the local computing device 115, 120, control panel 130, or remote computing device 140, the receiver module 210 may be configured to receive any of audio, video, light, physiological (including heart rate, respiration rate, posture, sleep status, identity, etc.), and/or movement (including occupancy and location) data (among other things) associated with the monitored occupant(s), where such data is detected by one or more sensor units positioned near the monitored occupant(s). Additionally, where receiver module 210 is an example of one or more aspects of a local computing device 115, 120, control panel 130, or remote computing device 140, receiver module 210 may receive occupant inputted privacy preferences regarding operation of the plurality of video monitoring components in the home. In other embodiments, where receiver module 210 is an example of one or more aspects of one or more sensor units 110, receiver module 210 may receive inputted occupant privacy preferences from a separate component of the home automation and/or security system, such as a control panel 130, local computing device 115, 120, or remote computing device 140. In any embodiment, data associated with the monitored occupant(s) may be passed on to the video component operation module 215, and to other components of the apparatus 205.

In some embodiments, video component operation module 215 may pass the data associated with the monitored occupant(s) received from receiver module 210 directly to transmitter module 220, without processing, for communication to at least one component of the home automation and/or security system. For example, where receiver module 210 detects that an occupant has entered the home, such detected occupancy data and/or other data may be communicated directly to a control panel associated with the home automation and/or security system via transmitter module 220. The control panel may derive an operation instruction from the received occupancy data, and may communicate this operation instruction to at least one of a plurality of video monitoring components in the home, directing those video monitoring components to disable operation. In this way, the detected occupant may be afforded privacy in his home upon entering.

In other embodiments, video component operation module 215 may receive data associated with the detected occupant(s) from receiver module 210, and may derive an operation instruction for implementation by at least one of the plurality of video monitoring components. An operation instruction may be derived based at least in part on an inputted privacy preference associated with the detected occupant(s). For example, where receiver module 210 detects a first occupant in the kitchen of the home, for example by detecting motion or vibration data using one or more sensors, receiver module 210 may communicate this occupancy data to the video component operation module 215. Receiver module 210 may also detect identity data associated with the detected first occupant, and may communicate this identity data to the video component operation module 215 as well. Video component operation module 215 may compare the identity of the detected first occupant with an inputted privacy preference associated with the first occupant, and may derive an operation instruction for at least one of the plurality of video monitoring components in the home based at least in part on this comparing. Video component operation module 215 may communicate this operation instruction to transmitter module 220, which may communicate the instruction to the appropriate video monitoring component(s) of the home automation and/or security system such that the video monitoring component(s) may be disabled or activated, as appropriate.

The transmitter module 220 may transmit the one or more signals received from other components of the apparatus 205. As described above, the transmitter module 220 may transmit data received from receiver module 210 directly to the control panel and/or individual video monitoring components of the home automation and/or security system without further processing by video component operation module 215 in some examples, or in other examples may transmit an operation instruction derived by video component operation module 215 as a result of video component operation module 215 processing the data received from receiver module 210. In some examples, the transmitter module 220 may be collocated with the receiver module 210 in a transceiver module. Data or signals transmitted from transmitter module 220 may be received at one or more components of the automation system, such as a control panel or a video monitoring unit, or may be received at a smartphone or a personal computing device for further processing before communicating an operation instruction the one or more video monitoring components.

Figure 3:
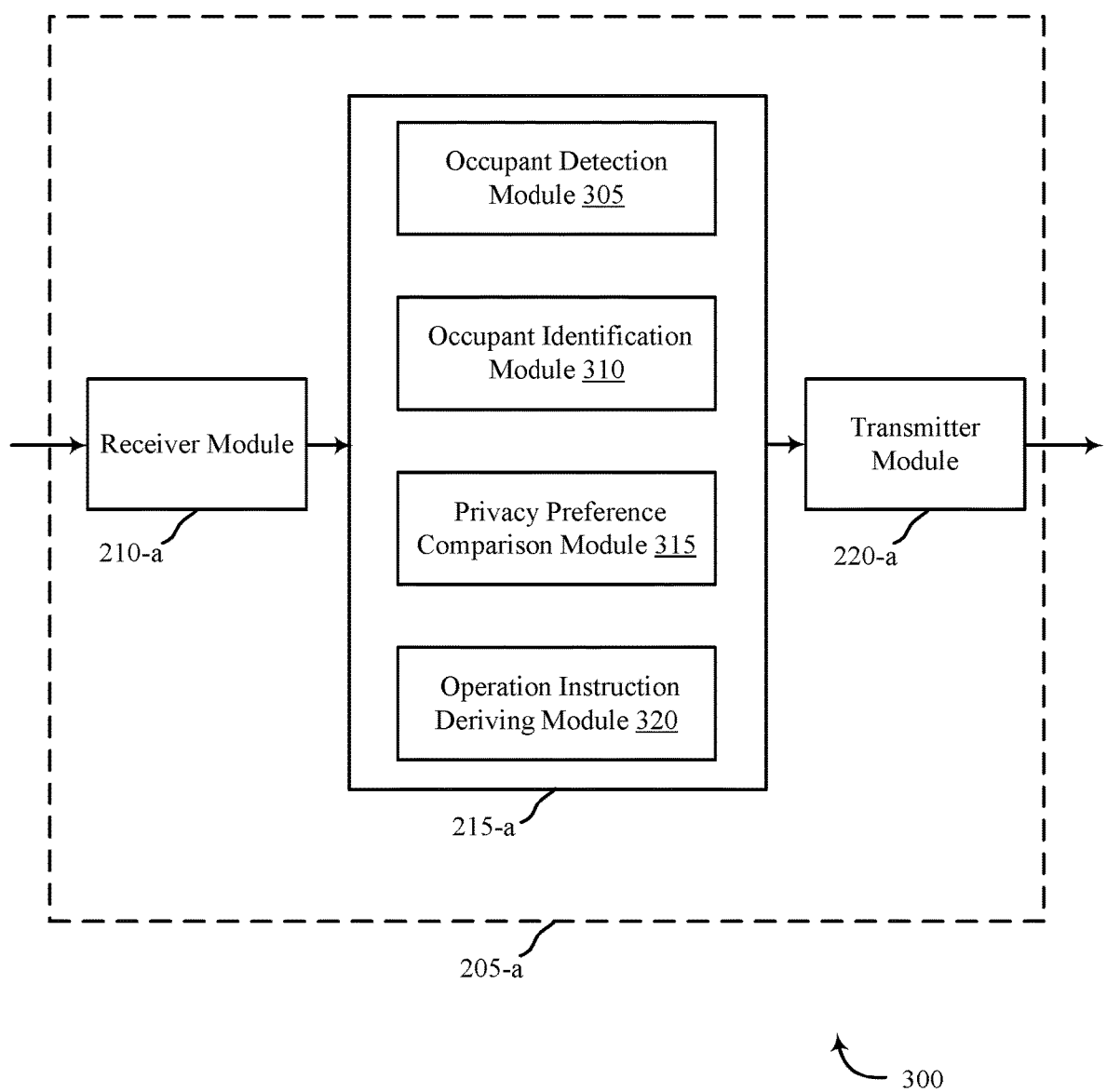
FIG. 3 shows a block diagram of a device relating to a home security and/or automation system, in accordance with various aspects of this disclosure.

FIG. 3 shows a block diagram 300 of an apparatus 205-*a* for use in automation and/or security systems, in accordance with various examples. The apparatus 205-*a* may be an example of one or more aspects of any of a control panel 130, one or more sensor units 110, local computing device 115, 120, and/or remote computing device 140 described with reference to FIG. 1, among others. It may also be an example of an apparatus 205 described with reference to FIG. 2. The apparatus 205-*a* may include a receiver module 210-*a*, a video component operation module 215-*a*, and/or a transmitter module 220-*a*, which may be examples of the corresponding modules of apparatus 205. The apparatus 205-*a* may also include a processor. Each of these components may be in communication with each other. The video component operation module 215-*a* may include one or more of an occupant detection module 305, an occupant identification module 310, a privacy preference comparison module 315, and/or an operation instruction deriving module 320. The receiver module 210-*a* and the transmitter module 220-*a* may perform the functions of the receiver module 210 and the transmitter module 220 of FIG. 2, respectively.

The components of the apparatus 205-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

As discussed above with reference to FIG. 2, where apparatus 205-*a* is an example of a component of one or more sensor units, receiver module 210-*a* may be configured to detect occupancy data and identity data associated with an occupant(s) in or entering the home, for example using motion, vibration, facial data recognition, wireless signal detection, and the like, sensing components of the apparatus 205-*a*. Receiver module 210-*a* may be further configured to receive occupant inputted privacy preferences, for example by wired or wireless transmission from a control panel or local computing device.

In other examples, where apparatus 205-*a* is an example of a component of any of a control panel, local computing device, or remote computing device, receiver module 210-*a* may be configured to receive occupancy data and identity data associated with the occupant(s) in or entering the home, for example by receiving a wired or wireless transmission of that data from one or more sensor units. Receiver module 210-*a* may further be configured to receive occupant inputted privacy preferences, for example inputted by the occupant directly at an interactive occupant interface, dedicated application, or the like, of the apparatus 205-*a*.

In any example, upon receiving or detecting occupancy data, occupant identity data, and/or occupant inputted privacy preferences, receiver module 210-*a* may communicate this data to video component operation module 215-*a*. Occupant detection module 305 may be configured to receive the occupancy data from receiver module 210-*a*, and detect that there is one or more occupant in the home. Occupancy detection may be performed by any known means, including by detecting motion, vibration, temperature, audio, video, physiological data, wireless signals associated with the occupant(s) (e.g., wireless signals given off by the occupant's smartphone), or the like. In some examples, occupancy detection module 305 may be configured to distinguish between a human and a non-human occupant, such as a pet, for example based on height or weight data received from receiver module 210-*a*. In some examples, occupant detection module 305 may be further configured to detect a relative or absolute location of the one or more detected occupants, for example using occupancy data received from one or more sensor units having known locations in the home.

Occupant identification module 310 may be configured to detect the identity of the one or more detect occupants in the home. Occupant identification may be performed by any known means, for example by identifying face shape, location of features, eye color, height, weight, or the like, and comparing this data with a database of known face shape, location of features, eye color, height, weight, and the like data associated with known individuals. Based on this comparing, occupant identification module 310 may derive an identity of each of the one more detected occupants.

Privacy preference comparison module 315 may be utilized in instances in which more than one occupant is detected in or entering the home, by occupant detection module 305. Occupant identification module 310 may communicate identities of each of the occupants to privacy preference comparison module 315. Further, receiver module 210-*a* may communicate occupant inputted privacy preferences associated with each of the identified occupants to privacy preference comparison module 315. Privacy preference comparison module 315 may accordingly compare each of the occupant inputted privacy preferences associated with each of the identified occupants, and may determine a priority of privacy preferences. For example, occupant identification module 310 may detect that both a father and a son are located in the family room of the home. The father may have inputted a privacy preference, for example at an occupant interface on a control panel associated with the home automation and/or security system, indicating that he prefers all video monitoring components of the system be disabled upon detecting that he has entered the home. The son may have inputted his own privacy preference at the control panel, for example indicating that he prefers that only those video monitoring components located in the same room which he is currently occupying be disabled. As the system administrator, the father may have indicated that his privacy preferences be given higher priority than the privacy preferences of other members of the household. In some examples, the privacy preference priority of each household member may be ranked. Accordingly, privacy preference comparison module 315 may compare the privacy preference of the father with the privacy preference of the son, and may reference the inputted privacy preference priority, and may accordingly determine that the privacy preferences associated with the father should be implemented.

Operation instruction deriving module 320 may receive the occupant identification information from occupant identification module 310, and where more than one occupant is identified, the privacy preference comparison information from privacy preference comparison module 315, and may derive one or more operation instruction accordingly. For example, where the father and son have been identified by occupant identification module 310, and where the father's privacy preferences have been given priority by privacy preference comparison module 315, operation instruction deriving module 320 may derive an instruction to disable each video monitoring component in the home. This operation instruction may be communicated to transmitter module 220-a, which may communicate the operation instruction to each of the plurality of video monitoring components in the home, and each of the plurality of video monitoring components may be disabled accordingly. In another example, where occupant identification module 310 identifies only the son, operation instruction deriving module 320 may derive an instruction to disable only those video monitoring components located in the same area or room of the house as is currently occupied by the son. Operation instruction deriving module 320 may communicate this instruction to transmitter module 220-a, which may communicate the instruction only to those video monitoring components which are positioned in the same area or room of the house that is currently occupied by the son, and these video monitoring components may be disabled accordingly.

In some embodiments, transmitter module 220-a may communicate the operation instruction to each of the plurality of video monitoring components individually, for implementation by each of the components. In other embodiments, transmitter module 220-a may communicate the operation instruction to a control panel associated with the home automation and/or security system, and the control panel may disseminate the operation instruction to the appropriate video monitoring components accordingly.

Figure 4:
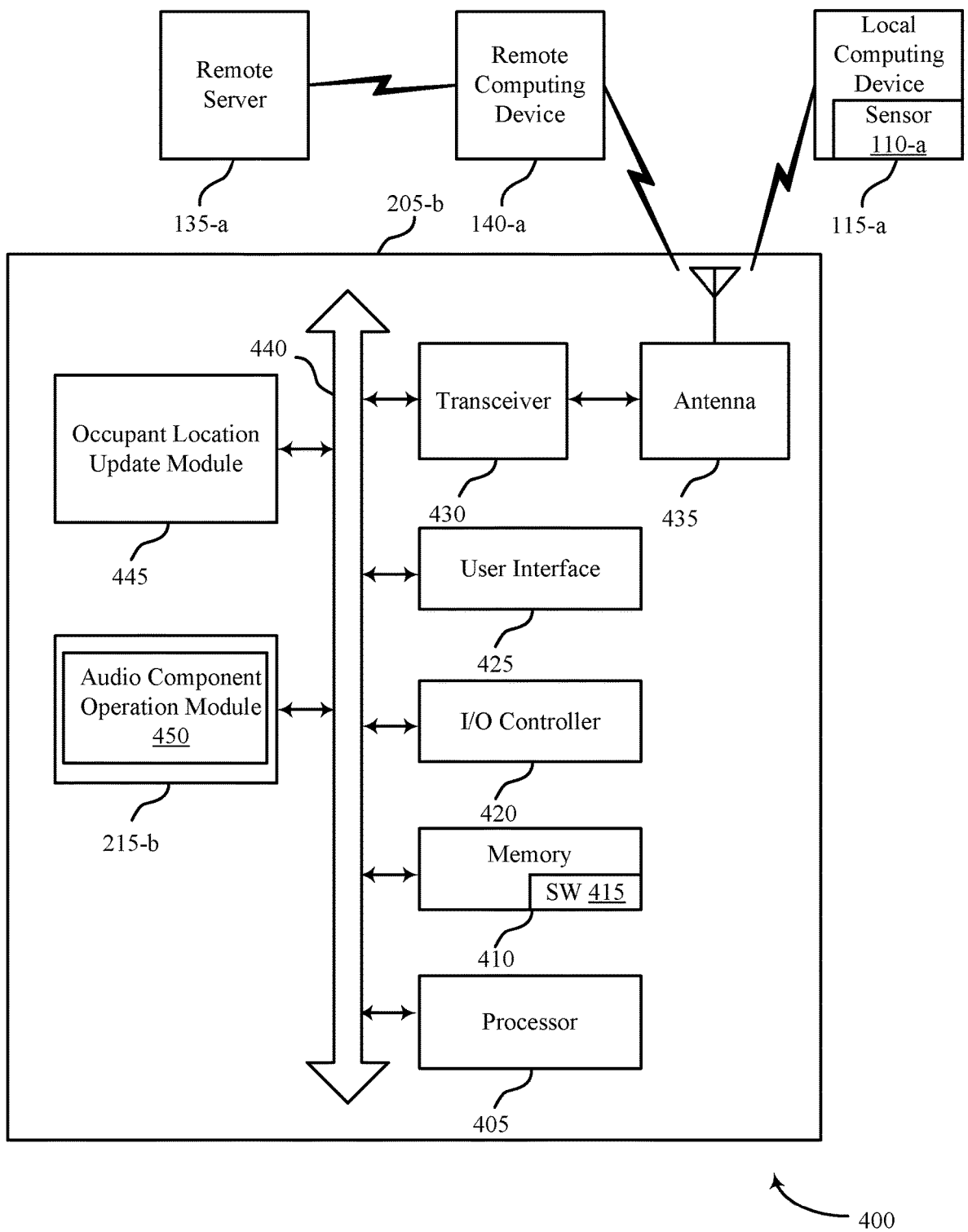
FIG. 4 shows a block diagram relating to a home security and/or automation system, in accordance with various aspects of this disclosure.

FIG. 4 shows a system 400 for use in security and/or automation systems, in accordance with various examples. System 400 may include an apparatus 205-b, which may be an example of one or more aspects of any of a control panel 130, one or more sensor units 110, local computing device 115, 120, and/or remote computing device 140 described with reference to FIG. 1, among others. Apparatus 205-b may also be an example of one or more aspects of apparatus 205 and/or 205-a of FIGS. 2 and 3.

Apparatus 205-b may include occupant location update module 445. Occupant location update module 445 may be configured to detect, on a continuous or interval basis, an updated location of each of the one or more occupants detected in the home. This detection of the occupant's location may be performed using any known occupancy detection means, including detecting motion, vibration, video, audio, physiological data, wireless signal data, or the like. This updated occupant location information may be utilized to derive updated operation instructions, for example by operation instruction deriving module 320 as discussed with reference to FIG. 3. For example, while a particular occupant was initially detected in a living room of the home, and an operation instruction to disable all video monitoring components located in the living room was accordingly derived, the occupant may have relocated thereafter to the kitchen. Occupant location update module 445 may detect this change in location of the occupant, and may communicate the occupant's updated location to operation instruction deriving module 320 such that an updated operating instruction may be derived, and the correct video monitoring components may be disabled or activated, as appropriate.

Apparatus 205-b may also include video component operation module 215-b, which may include video component operation module 215-b, which may include audio component operation module 450, configured to derive operation instructions for one or more audio components associated with the home automation and/or security system. Audio component operation module 450 may operate similarly to video component operation module 215, 215-a, as described with respect to FIGS. 2 and 3. In particular, audio component operation module 450 may receive occupancy data, occupant identity data, and/or occupant inputted privacy preference data, and may derive an operation instruction associated with the operation of one or more audio component of the home automation and/or security system based on that received data. In some examples, the one or more audio component may be integrated with the one or more video component of the home automation and/or security system. In other examples, the one or more audio components may be separate from the one or more video components. Occupant inputted privacy preferences may be consistent between operation of the audio and video components of the home automation and/or security system in some examples, while in other examples occupants may input distinct privacy preferences with respect to the audio and video components of the system. For example, an occupant may input a preference that, when he is at home, all video components in the house be disabled, while only those audio components located in the same room as the occupant be disabled, while the remaining audio components throughout the rest of the house remain active.

Apparatus 205-b may also include components for bi-directional data communications including components for transmitting communications and components for receiving communications. For example, apparatus 205-b may communicate bi-directionally with one or more of local computing device 115-a, one or more sensor units 110-a, remote computing device 140-a, and/or remote server 135-a, which may be examples of the local computing device 115, one or more sensor units 110, and server 135 of FIG. 1, among others. This bi-directional communication may be direct (e.g., apparatus 205-b communicating directly with remote computing device 140-a) and/or indirect (e.g., apparatus 205-b communicating indirectly with remote server 135-a through remote computing device 140-a).

Apparatus 205-b may also include a processor module 405, and memory 410 (including software/firmware code (SW) 415), an input/output controller module 420, an occupant interface module 425, a transceiver module 430, and one or more antennas 435, each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of local computing device 115-*a*, remote computing device 140-*a*, and/or remote server 135-*a*. The transceiver module 430 may include a modem to modulate the packets and provide the modulated packets to the one or more antennas 435 for transmission, and to demodulate packets received from the one or more antenna 435. While a an apparatus (e.g., 205-*b*) may include a single antenna 435, the apparatus may also have multiple antennas 435 capable of concurrently transmitting or receiving multiple wired and/or wireless transmissions. In some embodiments, one element of apparatus 205-*b* (e.g., one or more antennas 435, transceiver module 430, etc.) may provide a direct connection to a remote server 135-*a* via a direct network link to the Internet via a POP (point of presence). In some embodiments, one element of apparatus 205-*b* (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensor units 110-*a* (e.g., motion, audio, video, physiological, and/or one or more other sensors) may connect to some element of system 400 via a network using one or more wired and/or wireless connections.

In some embodiments, the occupant interface module 425 may include an audio device, such as an external speaker system, an external display device such as a display screen, and/or an input device (e.g., remote control device interfaced with the occupant interface module 425 directly and/or through input/output controller module 420).

One or more buses 440 may allow data communication between one or more elements of apparatus 205-*b* (e.g., processor module 405, memory 410, input/output controller module 420, occupant interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., detect occupancy, detect an identity of the occupant(s), receive occupant privacy preferences, derive an operation instruction associated with one or more video monitoring components, etc.). Alternatively, the computer-executable software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 may contain, among other things, the Basic Input-Output System (BIOS) which may control basic hardware and/or software operation such as the interaction with peripheral components or devices. For example, the physiological parameter module 445 to implement the present systems and methods may be stored within the memory 410. Applications resident with system 400 are generally stored on and accessed via a non-transitory computer readable medium, such as a hard disk drive or other storage medium. Additionally, applications may be in the form of electronic signals modulated in accordance with the application and data communication technology when accessed via a network interface (e.g., transceiver module 430, one or more antennas 435, etc.).

Many other devices and/or subsystems may be connected to, or may be included as, one or more elements of system 400 (e.g., entertainment system, computing device, remote cameras, wireless key fob, wall mounted occupant interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems may be interconnected in different ways from that shown in FIG. 4. In some embodiments, an aspect of some operation of a system, such as that shown in FIG. 4, may be understood in the art and is not discussed in detail in this application. Code to implement the present disclosure may be stored in a non-transitory computer-readable medium such as one or more of memory 410 or other memory. The operating system provided on input/output controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the apparatus (e.g., 205-*b*) may include a single antenna 435, the apparatus (e.g., 205-*b*) may have multiple antennas 435 capable of concurrently transmitting and/or receiving multiple wireless transmissions.

Figure 5:
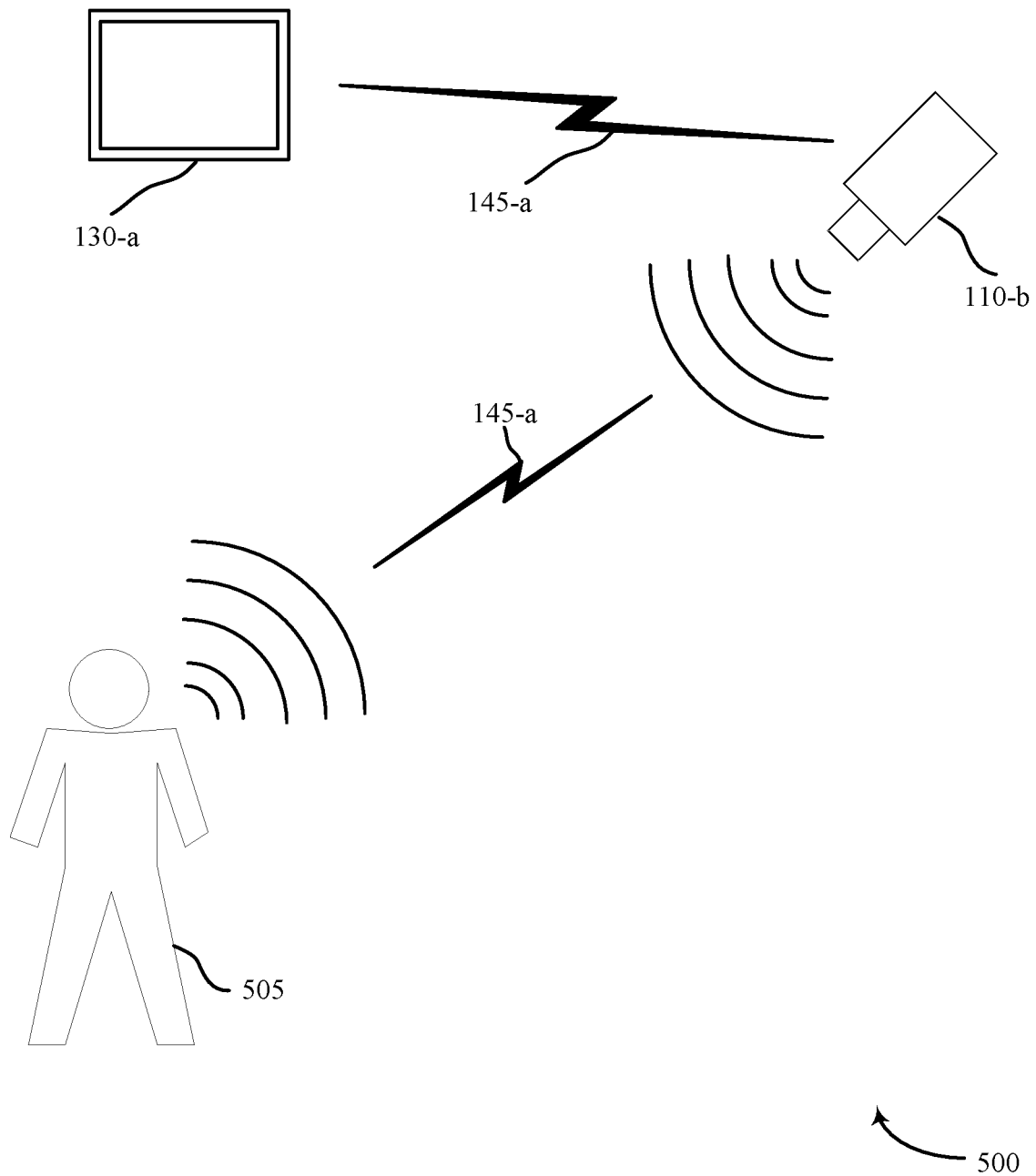
FIG. 5 shows a block diagram illustrating one embodiment of a home security and/or automation system, in accordance with various aspects of this disclosure.

FIG. 5 is a block diagram illustrating an example of the video monitoring system 500. In the illustrated example, one or more sensor units 110-*b* may detect data associated with an occupant 505. For example, sensor unit 110-*b*, which may be an example of one or more sensor units 110 described with respect to FIG. 1, may detect audio and/or video data, physiological data, movement data, environmental data, and/or the like. In the illustrated example, sensor unit 110-*b* may be and/or include a video camera or video monitoring component of the home automation system. Sensor unit 110-*b* may be configured to provide live and/or recorded video monitoring of the occupant 505. Sensor unit 110-*b* may also be configured to detect identity data associated with the occupant 505, such as facial recognition data, physiological data, wireless signal data from a device associated with the occupant 505, and the like.

In some examples, sensor unit 110-*b* may process the detected occupant identity data and may derive an operation instruction locally. In some examples, this processing may include comparing the detected occupant identity with inputted occupant privacy preferences, and deriving an operation instruction accordingly.

Figure 6:
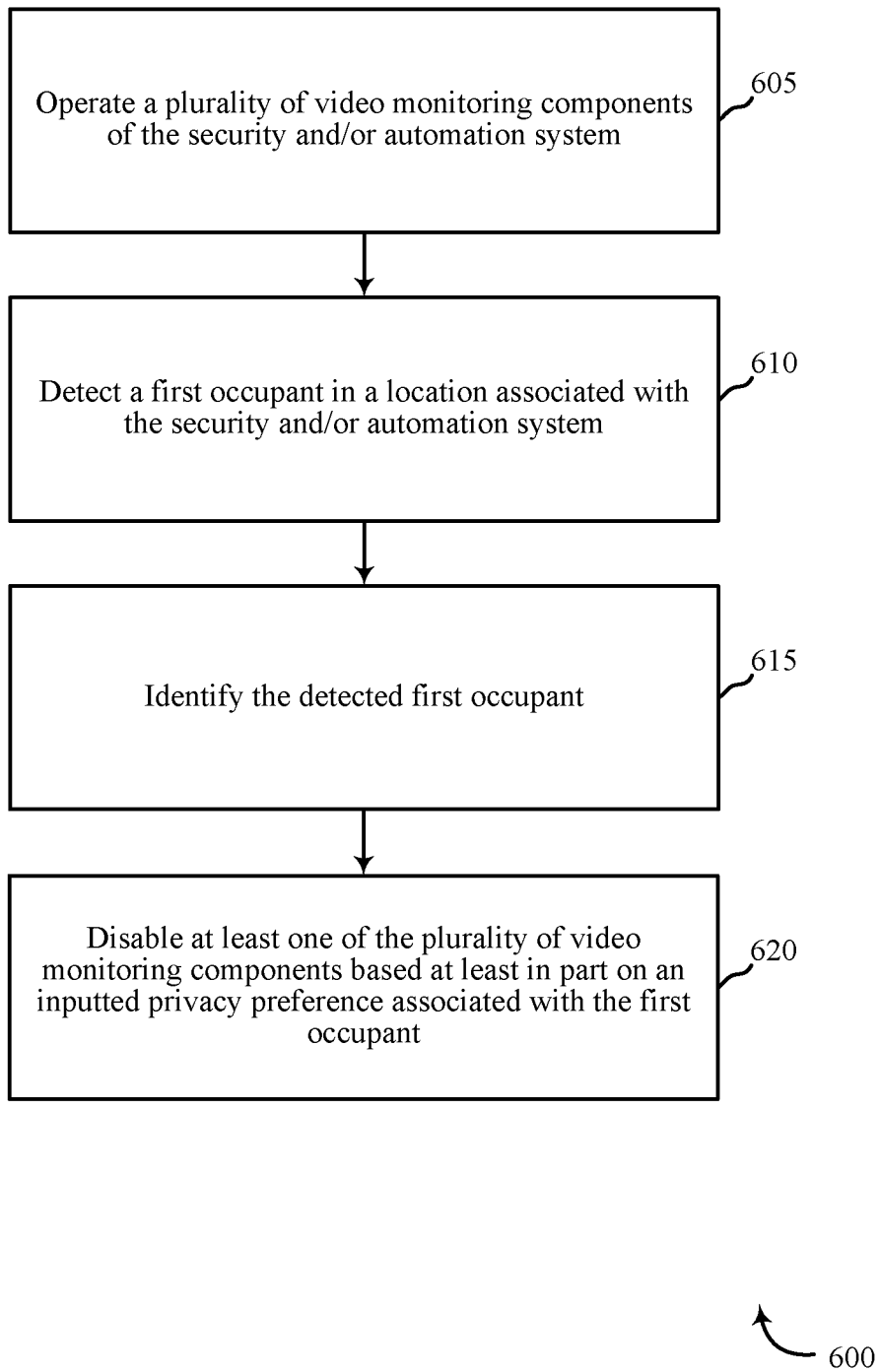
FIG. 6 is a flow chart illustrating an example of a method relating to a home security and/or automation system, in accordance with various aspects of this disclosure.

In other examples, sensor unit 110-*b* may transmit the detected occupancy data, occupant identity data, and/or other information directly on to control panel 130-*a* via wired or wireless communication links 145-*a*, which may be an example of control panel 130 described with reference to FIG. 1. Although illustrated as a control panel 130-*a* in video monitoring system 500, in other examples sensor unit 110-*a* may communicate detected occupancy data to a local computing device or remote computing device (e.g., 115, 120 and/or 140), as previously discussed. Upon receiving the detected occupancy data (among other data types), control panel 130-*a* may derive an operation instruction. Where control panel 130-*a* derives an operation instruction, as discussed above with respect to FIGS. 2 and 3, control panel 130-*a* may receive occupancy data associated with the monitored occupant 505 via wired or wireless communication links 145-*a* and may compare the received data with an occupant privacy preferences in order to determine an appropriate operation instruction for the one or more video monitoring components of the home automation and/or security system. Control panel 130-*a* may then communicate the derived operation instruction to the one or more video monitoring components for implementation FIG. 6 is a flow chart illustrating an example of a method 600 for providing occupant-specific privacy at one or more video monitoring components of a home automation and/or security system, in accordance with various aspects of the present disclosure. For clarity, the method 600 is described below with reference to aspects of one or more of the sensor units 110, local computing devices 115, 120, control panel 130, or remote computing device 140 described with reference to FIG. 1, and/or aspects of apparatus 205, 205-*a* described with reference to FIGS. 2 and 3, among others. In some examples, a control panel may execute one or more sets of codes to control the functional elements of the one or more sensor units to perform the functions described below. Additionally or alternatively, the control panel may perform one or more of the functions described below using special-purpose hardware.

At block 605, the method 600 may include operating a plurality of video monitoring components of the security and/or automation system. In some embodiments, the plurality of video monitoring components may be integrated with other components of the home automation and/or security system, such as a control panel or other device. In other examples, the plurality of video monitoring components may be freestanding components. In some examples, the video monitoring components may include an audio component, while in other examples, the video monitoring components may include only a video component.

At block 610, the method 600 may include detecting a first occupant in a location associated with the security and/or automation system. This occupant detection may be performed using one or more sensor units associated with the security and/or automation system. In some examples, the one or more sensor units may be integrated with the plurality of video monitoring components, while in other examples, the one or more sensor units may be freestanding components. In any example, the occupancy detection may be performed using any known means, including detecting motion, vibration, video, audio, physiological data, wireless signals from a device associated with the occupant, or the like. The location of the first occupant may be relative or absolute, and may be determined based on known locations of the one or more sensor units detecting the occupant.

At block 615, the method 600 may include identifying the detected first occupant. Identification of the first occupant may be performed by the one or more sensor units in some examples, by the plurality of video monitoring components in other examples, or by a control panel, local computing device, and/or remote computing device in still other examples. Identification of the detected first occupant may be performed by any known means, including identifying face shape, location of features, eye color, height, weight, or the like of the first occupant, and comparing this data with a database of known face shape, location of features, eye color, height, weight, and the like data associated with known individuals.

At block 620, the method 600 may include disabling at least one of the plurality of video monitoring components based at least in part on an inputted privacy preference associated with the first occupant. The privacy preference may be inputted at an occupant interface of a control panel in some examples, at a dedicated application on a local computing device (e.g., a personal computer or smartphone) in other examples, or on a webpage via a remote computing device in still other examples. The inputted privacy preference may indicate the occupant's preferences with respect to operation of the plurality of video monitoring components. For example, an occupant may indicate that, upon arriving home, he prefers that all video monitoring components in the home be disabled. In another example, an occupant may input a preference indicating that, upon arriving home, she prefers that only those video monitoring components that are positioned in the same room or area of the home in which she is located be disabled, while the remaining video monitoring components throughout the home remain active. In some examples, inputted occupant privacy preferences may also provide preferences relating to operation of audio monitoring components of the home. In some examples, these audio component preferences may be identical to the video component preferences, while in other examples, the audio component preferences may be distinct from the video component preferences.

Based at least in part on the inputted privacy preference associated with the first occupant, the method 600 may include disabling at least one of the plurality of video monitoring components. As described above with respect to FIGS. 2 and 3, block 620 may result in derivation of an operation instruction, to be disseminated to each of the plurality of video monitoring components for execution.

Figure 7:
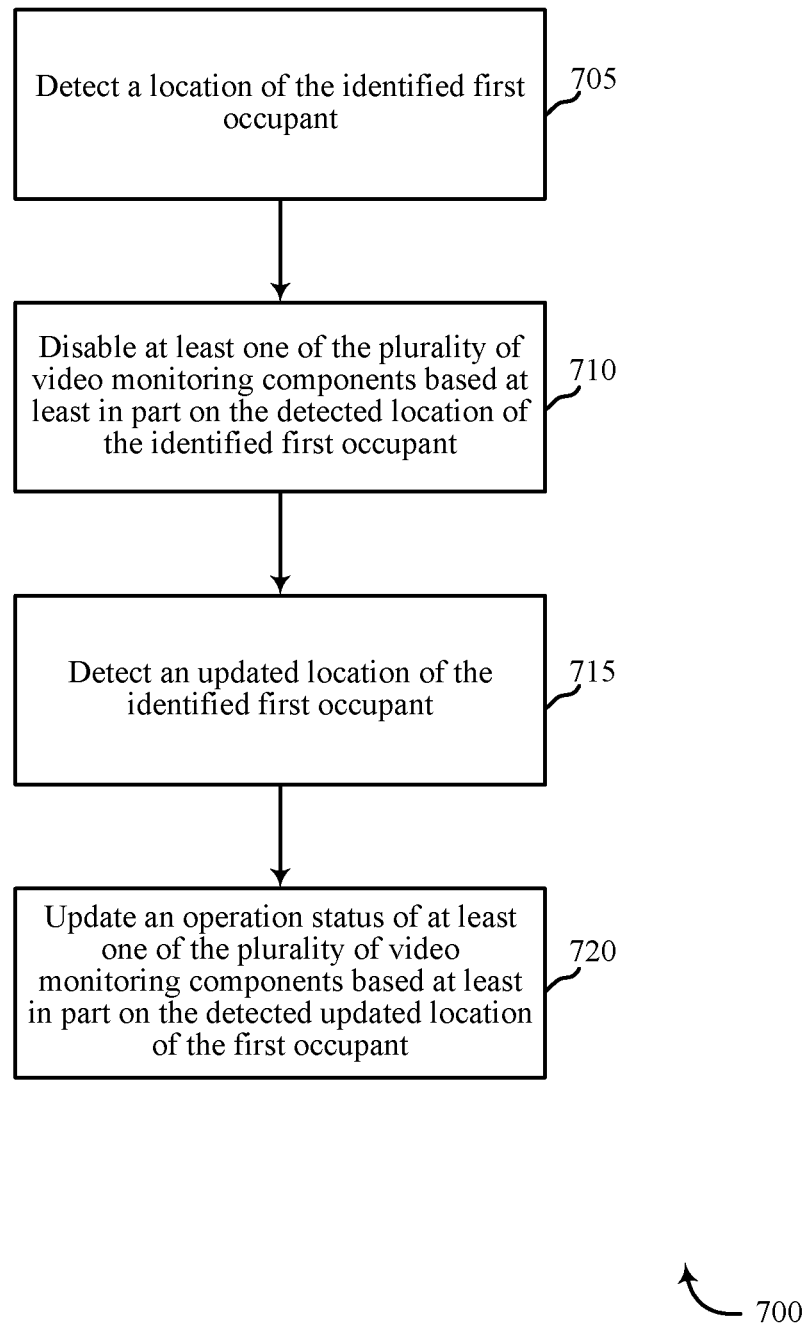
FIG. 7 is a flow chart illustrating an example of a method relating to a home security and/or automation system, in accordance with various aspects of this disclosure.

FIG. 7 is a flow chart illustrating an example of a method 700 for providing updated privacy based on location information for an occupant. For clarity, the method 700 is described below with reference to aspects of one or more of the sensor units 110, local computing devices 115, 120, control panel 130, or remote computing device 140 described with reference to FIG. 1, and/or aspects of apparatus 205, 205-*a* described with reference to FIGS. 2 and 3, among others. In some examples, a control panel may execute one or more sets of codes to control the functional elements of the one or more sensor units to perform the functions described below. Additionally or alternatively, the control panel may perform one or more of the functions described below using special-purpose hardware.

At block 705, the method 700 may include detecting a location of the identified first occupant. As previously discussed with respect to FIG. 6, this location detection may be performed using one or more sensor units in some examples, or may be performed by the plurality of video monitoring components in other examples. In any embodiment, the location of the identified first occupant may be determined using known occupancy detection means, including detecting motion, vibration, video, audio, physiological data, wireless signals from a device associated with the occupant, or the like.

At block 710, the method 700 may include disabling at least one of the plurality of video monitoring components based at least in part on the detected location of the identified first occupant. As discussed above with respect to FIG. 6, the video monitoring components may be disabled based on occupant inputted privacy preferences. For example, one occupant may have indicated that he prefers that all video monitoring components in the house be disabled upon his entering the home. A different occupant may instead input a preference that only those video monitoring components positioned in the location currently occupied by the occupant be disabled. In the latter example, at least one of the plurality of video monitoring components may be disabled based at least in part on the detected location of the identified occupant.

At block 715, the method 700 may include detecting an updated location of the identified first occupant. As discussed above with respect to FIG. 4, one or more sensor units, or other monitoring components of the home automation and/or security system, may monitor, either continuously or at intervals, a current location of one or more occupants in the home. Where the occupant relocates in the home, this updated location of the occupant may be detected. Occupant locations may be detected using any known occupancy detection means, as previously discussed. For example, one or more sensing components of the system may detect any of motion, vibration, video, audio, physiological data, wireless signals from a device associated with the occupant, or the like, and may derive a relative or absolute location of the occupant accordingly.

At block 720, the method 700 may include updating an operation status of at least one of the plurality of video monitoring components based at least in part on the detected updated location of the first occupant. Thus, as the detected occupant moves through his home, each of the plurality of video monitoring components may be updated between an active or disabled state based upon the occupant's location and privacy preferences. This allows for active, automatic, and targeted privacy, while still providing security as desired by the occupant.

In some examples, aspects from two or more of the methods 600 and 700 may be combined, omitted, and/or separated. It should be noted that the methods 600 and 700 are just example implementations, and that the operations of the methods 600 and 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for security or automation systems, comprising:
    operating a plurality of video monitoring components and audio monitoring components of the security or automation system;
    detecting a first occupant in a first location associated with the security or automation system and a second occupant in a second location associated with the security or automation system;
    identifying the detected first occupant and the detected second occupant, the identifying comprising identifying an inputted code associated with the first occupant, an inputted code associated with the second occupant, or both;
    comparing a first audio privacy preference and a first video privacy preference associated with the first occupant, the first audio privacy preference and the first video privacy preference inputted by the first occupant, and a second audio privacy preference and a second video privacy preference associated with the second occupant, the second audio privacy preference and the second video privacy preference inputted by the second occupant;
    comparing a priority of the first audio privacy preference and the first video privacy preference associated with the first occupant with a priority of the second audio privacy preference and the second video privacy preference associated with the second occupant; and
    updating an operation status of at least one of the plurality of video monitoring components and at least one of the plurality of audio monitoring components in accordance with the first audio privacy preference and the first video privacy preference of the first occupant or the second audio privacy preference and the second video privacy preference of the second occupant based at least in part on the identifying the detected first occupant and the detected second occupant, and based at least in part on the comparing the priority of the first audio privacy preference and the first video privacy preferences of the first occupant and the second audio privacy preference and the second video privacy preference of the second occupant.

2. The method of claim 1, wherein updating an operation status of the at least one of the plurality of video monitoring components comprises:
    disabling at least one of the plurality of video monitoring components based at least in part on the detected first location of the identified first occupant.

3. The method of claim 2, wherein the disabled at least one of the plurality of video monitoring components are positioned proximate to the detected first location of the identified first occupant.

4. The method of claim 2, further comprising:
    detecting an updated location of the identified first occupant; and updating an operation status of at least one of the plurality of video monitoring components based at least in part on the detected updated location of the first occupant.

5. The method of claim 1, further comprising:
detecting that the identified first occupant has left the first location; and
operating at least one of the plurality of video monitoring components based at least in part on the detecting.

6. The method of claim 1, further comprising:
updating the operation status of at least one of the plurality of video monitoring components based at least in part on an inputted command; and
deriving a privacy priority preference based at least in part on the inputted command.

7. The method of claim 1, wherein each of the plurality of monitoring components of the security or automation system comprises a video monitoring component and an audio monitoring component.

8. The method of claim 7, wherein updating the operational status of at least one of the plurality of monitoring components comprises disabling the video monitoring components, or disabling the audio monitoring components, or disabling a combination thereof.

9. The method of claim 1, wherein identifying the detected first occupant further comprises identifying facial data associated with the first occupant and audio data associated with the first occupant.

10. An apparatus for security or automation systems, comprising:
a processor;
memory in electronic communication with the processor; and
instructions stored in the memory, the instructions being executable by the processor to:
operate a plurality of video monitoring components and audio monitoring components of the security or automation system;
detect a first occupant in a first location associated with the security or automation system and a second occupant in a second location associated with the security or automation system;
identify the detected first occupant and the detected second occupant, the identifying comprising identifying an inputted code associated with the first occupant, an inputted code associated with the second occupant, or both;
compare a first audio privacy preference and a first video privacy preference associated with the first occupant, the first audio privacy preference and the first video privacy preference inputted by the first occupant, and a second audio privacy preference and a second video privacy preference associated with the second occupant, the second audio privacy preference and the second video privacy preference inputted by the second occupant;
compare a priority of the first audio privacy preference and the first video privacy preference associated with the first occupant with a priority of the second audio privacy preference and the second video privacy preference associated with the second occupant; and
update an operation status of at least one of the plurality of video monitoring components and at least one of the plurality of audio monitoring components in accordance with the first audio privacy preference and the first video privacy preference of the first occupant or the second audio privacy preference and the second video privacy preference of the second occupant based at least in part on the identifying the detected first occupant and the detected second occupant, and based at least in part on the comparing the priority of the first audio privacy preference and the first video privacy preferences of the first occupant and the second audio privacy preference and the second video privacy preference of the second occupant.

11. The apparatus of claim 10, wherein updating an operation status of the at least one of the plurality of video monitoring components comprises:
disabling at least one of the plurality of video monitoring components based at least in part on the detected first location of the identified first occupant.

12. The apparatus of claim 11, wherein the disabled at least one of the plurality of video monitoring components are positioned proximate to the detected first location of the identified first occupant.

13. The apparatus of claim 11, the instructions being further executable by the processor to:
detect an updated location of the identified first occupant; and
update an operation status of at least one of the plurality of video monitoring components based at least in part on the detected updated location of the first occupant.

14. The apparatus of claim 10, the instructions being further executable by the processor to:
detect that the identified first occupant has left the first location; and
operate at least one of the plurality of video monitoring components based at least in part on the detecting.

15. The apparatus of claim 10, wherein each of the plurality of monitoring components of the security or automation system comprises a video monitoring component and an audio monitoring component.

16. The apparatus of claim 15, wherein disabling at least one of the plurality of monitoring components comprises disabling the video monitoring components, or disabling the audio monitoring components, or disabling a combination thereof.

17. The apparatus of claim 10, wherein identifying the detected first occupant further comprises identifying facial data associated with the first occupant and audio data associated with the first occupant, or a wireless signal transmitted by a device associated with the first occupant.

18. A non-transitory computer-readable medium storing computer-executable code, the code executable by a processor to:
operate a plurality of video monitoring components and audio monitoring components of the security or automation system;
detect a first occupant in a first location associated with the security or automation system and a second occupant in a second location associated with the security or automation system;
identify the detected first occupant and the detected second occupant, the identifying comprising identifying an inputted code associated with the first occupant, an inputted code associated with the second occupant, or both;
compare a first audio privacy preference and a first video privacy preference associated with the first occupant, first audio privacy preference and the first video privacy preference inputted by the first occupant, and a second audio privacy preference and a second video privacy preference associated with the second occupant, the second audio privacy preference and the second video privacy preference inputted by the second occupant;

compare a priority of the first audio privacy preference and the first video privacy preference associated with the first with a priority of the second audio privacy preference and the second video privacy reference associated with the second occupant; and update an operation status of at least one of the plurality of video monitoring components and at least one of the plurality of audio monitoring components in accordance with the first audio privacy preference and the first video privacy preference of the first occupant or the second audio privacy preference and the second video privacy preference of the second occupant, based at least in part on at least one of the detected first location of the first occupant and the detected second location of the second occupant, and based at least in part on the comparing the priority of the first audio privacy preference and the first video privacy preferences of the first occupant and the second audio privacy preference and the second video privacy preference of the second occupant.

* * * * *